(12) United States Patent
Han et al.

(10) Patent No.: US 8,954,662 B2
(45) Date of Patent: Feb. 10, 2015

(54) SSD CONTROLLER, AND METHOD FOR OPERATING AN SSD CONTROLLER

(75) Inventors: Moon Soo Han, Seongnam-si (KR); Young Goan Kim, Seongnam-si (KR)

(73) Assignee: OCZ Storage Solutions Inc., San Jose, CA (US)

( * ) Notice: Subject to any disclaimer, the term of this patent is extended or adjusted under 35 U.S.C. 154(b) by 49 days.

(21) Appl. No.: 13/257,458

(22) PCT Filed: Dec. 16, 2009

(86) PCT No.: PCT/KR2009/007517
§ 371 (c)(1),
(2), (4) Date: Sep. 19, 2011

(87) PCT Pub. No.: WO2010/107173
PCT Pub. Date: Sep. 23, 2010

(65) Prior Publication Data
US 2012/0011334 A1     Jan. 12, 2012

(30) Foreign Application Priority Data
Mar. 20, 2009   (KR) .................. 10-2009-0023989

(51) Int. Cl.
*G06F 13/00*   (2006.01)
*G06F 13/28*   (2006.01)
*G06F 13/38*   (2006.01)

(52) U.S. Cl.
CPC .................. *G06F 13/385* (2013.01)
USPC ............. 711/110; 711/112; 711/E12.019; 710/52

(58) Field of Classification Search
USPC ............. 711/110, 112, E12.019; 710/52
See application file for complete search history.

(56) References Cited

U.S. PATENT DOCUMENTS

| | | | |
|---|---|---|---|
| 2008/0107396 A1* | 5/2008 | Chung et al. | 386/85 |
| 2011/0082952 A1* | 4/2011 | Liu et al. | 710/52 |

FOREIGN PATENT DOCUMENTS

| | | |
|---|---|---|
| KR | 2030086801 | 11/2003 |
| KR | 20070045114 | 5/2007 |
| KR | 20080065450 | 7/2008 |
| KR | 20090008766 | 1/2009 |

* cited by examiner

Primary Examiner — Edward Dudek, Jr.
(74) Attorney, Agent, or Firm — Hartman Global IP Law; Gary M. Hartman; Michael D. Winter

(57) ABSTRACT

A Solid State Drive (SSD) controller is disclosed. When a data read command is transmitted by a host, the SSD controller may select a representative pointer from at least one first pointer by checking a point in time when data writing is completed in a buffer by at least one memory, read the data from the buffer by referring to a second pointer, and transmit the read data to the host, based on the representative pointer.

10 Claims, 4 Drawing Sheets

SSD CONTROLLER, AND METHOD FOR OPERATING AN SSD CONTROLLER

CROSS-REFERENCE TO RELATED APPLICATIONS

This application is the National Stage of International Application No. PCT/KR2009/007517, filed on Dec. 16, 2009, which claims the priority of Korean Patent Application No. 10-2009-0023989, filed on Mar. 20, 2009. The contents of all applications are hereby incorporated by reference in their entirety.

TECHNICAL FIELD

The present invention relates to a Solid State Drive (SSD) controller, and a method of operating the SSD controller, and more particularly, to an SSD controller, and a method of operating the SSD controller that may efficiently manage a pointer to be referred to when a plurality of memories included in the SSD accesses a buffer.

BACKGROUND ART

A storage device for storing data may include, for example, a magnetic disk, a semiconductor memory, and the like. Since physical characteristics are different for each type of storage device, a management method corresponding to the distinctive physical characteristics is required.

Conventionally, magnetic disks are widely used as storage devices. A read/write time of the magnetic disk takes an average of several milliseconds per kilobyte. Additionally, since an arrival time of an arm of the magnetic disk is different depending on a physical location where data is stored, the read/write time of the magnetic disk varies.

Recently, a non-volatile memory that takes a relatively short read/write time, consumes a small amount of power, and occupies a small amount of space, when compared to a magnetic disk, is rapidly replacing the magnetic disk. This is because a capacity of the non-volatile memory is increasing.

The non-volatile memory may electronically perform reading, writing, and erasing. The non-volatile memory is a semiconductor memory device that is able to maintain stored data even when power is interrupted. A process of storing data in a non-volatile memory device is additionally referred to as programming, as well as writing.

A typical example of the non-volatile memory includes a flash memory. The flash memory has advantages of a small size, a low power consumption, and a high read rate, when compared to a conventional Hard Disk Drive (HDD). Recently, a Solid State Disk (SSD) using a high-capacity flash memory was proposed to replace an HDD.

The flash memory may typically include, for example, a NAND-type flash memory, a NOR-type flash memory, and the like. A NAND scheme and a NOR scheme may be distinguished based on a configuration and an operating scheme of a cell array.

A flash memory includes an array of a plurality of memory cells, and a single memory cell may store at least one data bit. A single memory cell includes a control gate and a floating gate, and an insulator is inserted between the control gate and the floating gate. An insulator is also inserted between the floating gate and a substrate.

The non-volatile memory is managed by a predetermined controller. Additionally, an overall performance of the non-volatile memory may be determined based on a performance of the controller.

Accordingly, there is a desire for research on a method that may efficiently manage and control a memory.

DISCLOSURE OF INVENTION

Technical Goals

An aspect of the present invention provides a Solid State Drive (SSD) controller, and a method of operating the SSD controller that may reduce complexity of pointer management, by selecting a representative pointer from a plurality of pointers corresponding to a plurality of memories included in an SSD, and managing only an access to the representative pointer in management of a dynamic random access memory (DRAM) buffer included in the SSD.

Technical Solutions

According to an aspect of the present invention, there is provided a Solid State Drive (SSD) controller, including a command unit to transmit a data read command to at least one memory when the data read command is transmitted by a host, a pointer selection unit to select a representative pointer from at least one first pointer, by checking a point in time when writing of data in a buffer is completed by the at least one memory, and a transmitter to read the data from the buffer by referring to a second pointer, and to transmit the read data to the host, based on the representative pointer. Here, the at least one memory may write the data in the buffer by referring to the at least one first pointer.

According to another aspect of the present invention, there is provided an SSD controller, including a command unit to transmit a data write command to at least one memory when the data write command is transmitted by a host, a pointer selection unit to select a representative pointer from at least one first pointer, by checking a point in time when data is read from a buffer by the at least one memory, and a writer to receive the data from the host, and to write the data in the buffer by referring to a second pointer, based on the representative pointer. Here, the at least one memory may read the data from the buffer by referring to the at least one first pointer.

According to still another aspect of the present invention, there is provided a method of operating an SSD controller, the method including transmitting a data read command to at least one memory when the data read command is transmitted by a host, selecting, as a representative pointer, a pointer having a lowest pointer value from at least one first pointer, by checking a point in time when writing of data in a buffer is completed by the at least one memory, and reading the data from the buffer by referring to a second pointer, and transmitting the read data to the host, based on the representative pointer. Here, the at least one memory may write the data in the buffer by referring to the at least one first pointer.

According to further another aspect of the present invention, there is provided a method of operating an SSD controller, the method including transmitting a data write command to at least one memory when the data write command is transmitted by a host, selecting, as a representative pointer, a pointer having a lowest pointer value from at least one first pointer, by checking a point in time when data is read from a buffer by the at least one memory, and receiving the data from the host, and writing the data in the buffer by referring to a second pointer, based on the representative pointer. Here, the at least one memory may read the data from the buffer by referring to the at least one first pointer.

Effect of Invention

It is possible to reduce complexity of pointer management by providing a Solid State Drive (SSD) controller, and a method of operating the SSD controller that may select a representative pointer from a plurality of pointers corresponding to a plurality of memories included in an SSD, and may manage only an access to the representative pointer in management of a dynamic random access memory (DRAM) buffer included in the SSD.

BEST MODE FOR CARRYING OUT THE INVENTION

Figure 1:
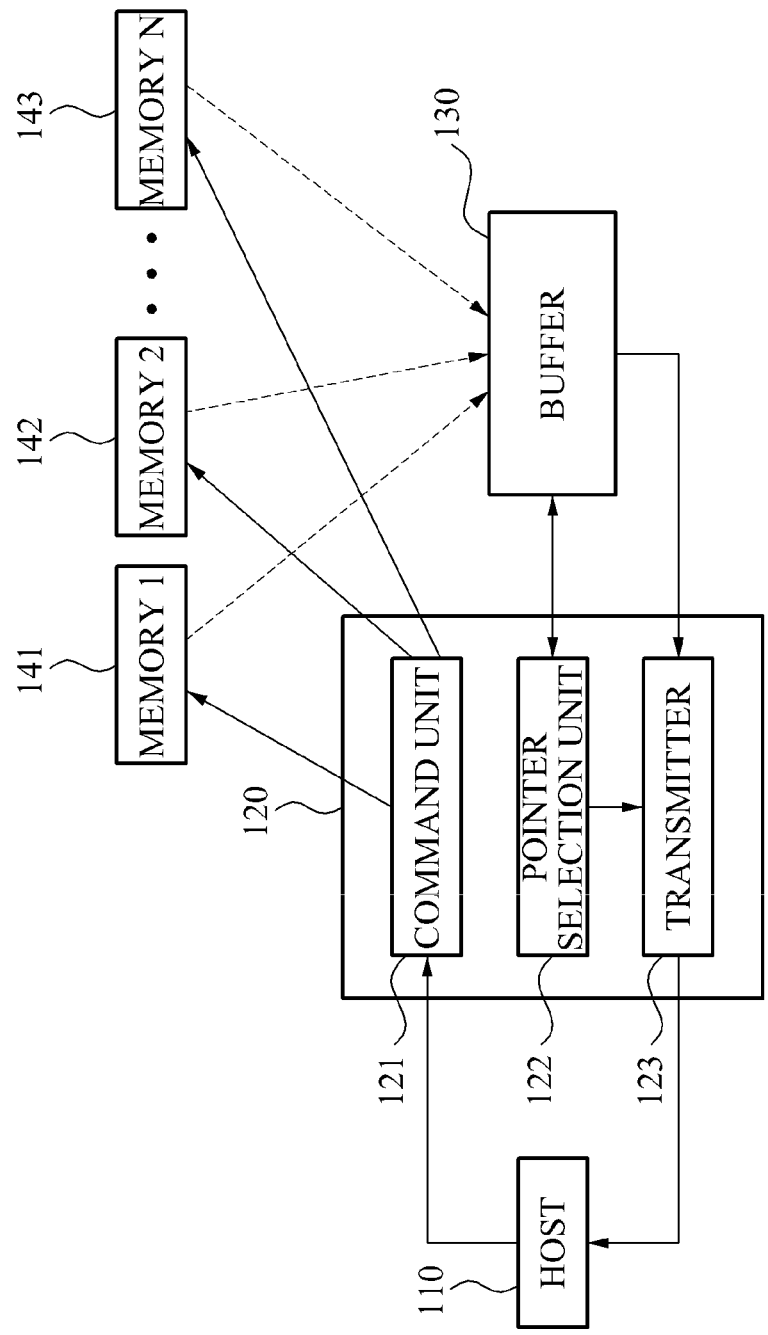
FIG. 1 is a diagram illustrating a configuration of a Solid State Drive (SSD) controller according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Generally, programming of a non-volatile memory may be performed in page units and erasing may be performed in block units. Here, a block may include a plurality of pages.

Also, a memory controller for managing the non-volatile memory may provide a logical address to an external host or a processor, and may provide a physical address with respect to the non-volatile memory.

In this instance, the memory controller may manage the non-volatile memory using the physical address, and may convert the physical address into the logical address.

Here, a layer in which converting of the physical address and the logical address is performed is referred to as a Flash Translation Layer (FTL).

Generally, a Solid State Drive (SSD) includes a plurality of memory chips and buses, a controller to perform an FTL, and a memory to buffer a request of a host system. The SSD may achieve a high performance by operating the plurality of chips and buses in parallel. The FTL included in the SSD performs an operation by classifying, in the plurality of chips, blocks having a logically identical block number into a block group, and pages having a logically identical page number into a page group. Here, the block group and the page group are logical units. In this instance, the FTL performs in parallel a read operation and a write operation for the page group, in every chip, thereby improving an overall performance of the SSD. Also, the FTL performs, in parallel, an erase operation for the block group with respect to blocks of all chips, thereby improving the performance of the SSD.

A recent SSD includes a dynamic random access memory (DRAM), which is used as a buffer when data is read from a flash memory, or written in the flash memory.

In a scheme of using a DRAM buffer in a conventional hard disk, a host manages a first pointer pointing towards the DRAM buffer, and a hard disk manages a second pointer pointing towards the DRAM buffer.

When a data request signal is transmitted by the host, the hard disk writes data in the DRAM buffer by referring to the first pointer, and the host reads the data from the DRAM buffer by referring to the second pointer.

Unlike the conventional hard disk, since the SSD includes a plurality of flash memories, the number of pointers pointing towards the DRAM buffer increases depending on the number of the plurality of flash memories.

Accordingly, when a DRAM buffer is used in the SSD, the number of the pointers to be managed increases, and a difficulty in managing the pointers by the SSD controller, and performance deterioration throughout the SSD may occur.

According to embodiments of the present invention, the SSD controller may select, as a representative pointer, one of a plurality of pointers to be used when a plurality of flash memories writes data in a DRAM buffer, or reads the data from the DRAM buffer, and may manage only an access to the representative pointer, and an access to a pointer used when a host writes the data in the DRAM buffer, or reads the data from the DRAM buffer, thereby reducing complexity of pointer management.

Accordingly, the SSD controller according to embodiments of the present invention will be further described with reference to FIGS. 1 and 2.

FIG. 1 is a diagram illustrating a configuration of an SSD controller 120 according to an embodiment of the present invention.

Referring to FIG. 1, a host 110, the SSD controller 120, a buffer 130, and at least one memory, for example, memories 141, and 142 through 143 are illustrated.

The SSD controller 120 may include a command unit 121, a pointer selection unit 122, and a transmission unit 123.

The buffer 130 may correspond to a DRAM buffer.

Also, the buffer 130 may correspond to a circular buffer.

Additionally, the at least one memory 141, and 142 through 143 may correspond to at least one flash memory.

The command unit 121 may transmit a data read command to the at least one memory 141, and 142 through 143 when the data read command is transmitted by the host 110.

In this instance, the at least one memory 141, and 142 through 143 may write data in the buffer 130 by referring to at least one first pointer that may be referred to when the at least one memory 141, and 142 through 143 writes the data in the buffer 130.

The pointer selection unit 122 may select a representative pointer from the at least one first pointer, by constantly checking a point in time when the data writing is completed in the buffer 130 by the at least one memory 141, and 142 through 143.

The pointer selection unit 122 may select, as the representative pointer, a pointer having a lowest pointer value from the at least one first pointer.

The transmitter 123 may read the data from the buffer 130 by referring to a second pointer, and may transmit the read data to the host 110, based on the representative pointer. Here, the second pointer may be referred to when the data is read from the buffer 130, and transmitted to the host 110.

When a pointer value of the representative pointer is greater than a pointer value of the second pointer, the transmitter 123 may read the data by moving the second pointer in the buffer 130 until the pointer value of the second pointer is equal to the pointer value of the representative pointer.

The SSD controller 120 may manage only an access to a representative pointer by selecting, as the representative pointer, a pointer having a lowest pointer value from the at least one first pointer, thereby reducing complexity of pointer management.

Figure 2:
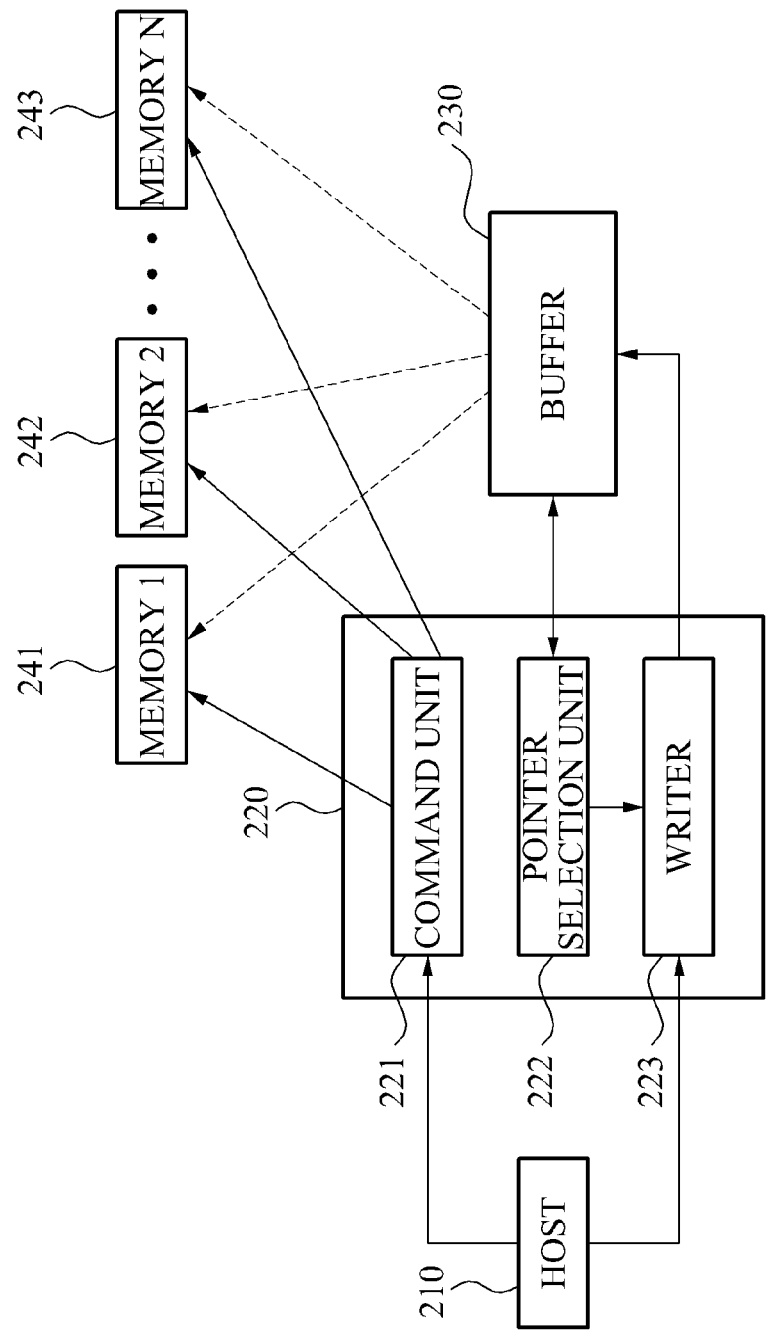
FIG. 2 is a diagram illustrating a configuration of an SSD controller according to another embodiment of the present invention.

FIG. 2 is a diagram illustrating a configuration of an SSD controller 220 according to another embodiment of the present invention.

Referring to FIG. 2, a host 210, the SSD controller 220, a buffer 230, and at least one memory, for example, memories 241, and 242 through 243 are illustrated.

The SSD controller 220 may include a command unit 221, a pointer selection unit 222, and a writer 223.

The buffer 230 may correspond to a DRAM buffer.

Also, the buffer 230 may correspond to a circular buffer.

Additionally, the at least one memory 241, and 242 through 243 may correspond to at least one flash memory.

The command unit 221 may transmit a data write command to the at least one memory 241, and 242 through 243 when the data write command is transmitted by the host 210.

The pointer selection unit 222 may select a representative pointer from at least one first pointer, by constantly checking a point in time when data is read from the buffer 230 by the at least one memory 241, and 242 through 243. Here, the at least one first pointer may be referred to when the at least one memory 241, and 242 through 243 writes the data in the buffer 230.

The pointer selection unit 222 may select, as the representative pointer, a pointer having a lowest pointer value from the at least one first pointer.

The writer 223 may receive the data from the host 210, and may write the data in the buffer 230 by referring to a second pointer, based on the representative pointer. Here, the second pointer may be referred to when the data transmitted from the host 210 is written in the buffer 230.

When a pointer value of the representative pointer is less than a pointer value of the second pointer, the writer 223 may write the data by moving the second pointer in the buffer 230 until the pointer value of the second pointer is equal to the pointer value of the representative pointer.

In this instance, the at least one memory 241, and 242 through 243 may read the data from the buffer 230 by referring to the at least one first pointer.

The SSD controller 220 may manage only an access to a representative pointer by selecting, as the representative pointer, a pointer having a lowest pointer value from the at least one first pointer, thereby reducing complexity of pointer management.

The SSD controller in a case of reading data from at least one memory included in an SSD, and the SSD controller in a case of writing the data in the at least one memory have been described in detail with reference to FIGS. 1 and 2, and will be omitted here for conciseness.

The SSD controllers described using FIGS. 1 and 2 may be configured to be one SSD controller.

In other words, the SSD controllers may be configured to be separate SSD controllers as illustrated in FIGS. 1 and 2, and may also be configured to be one SSD controller by integrating the embodiments illustrated in FIGS. 1 and 2.

Figure 3:
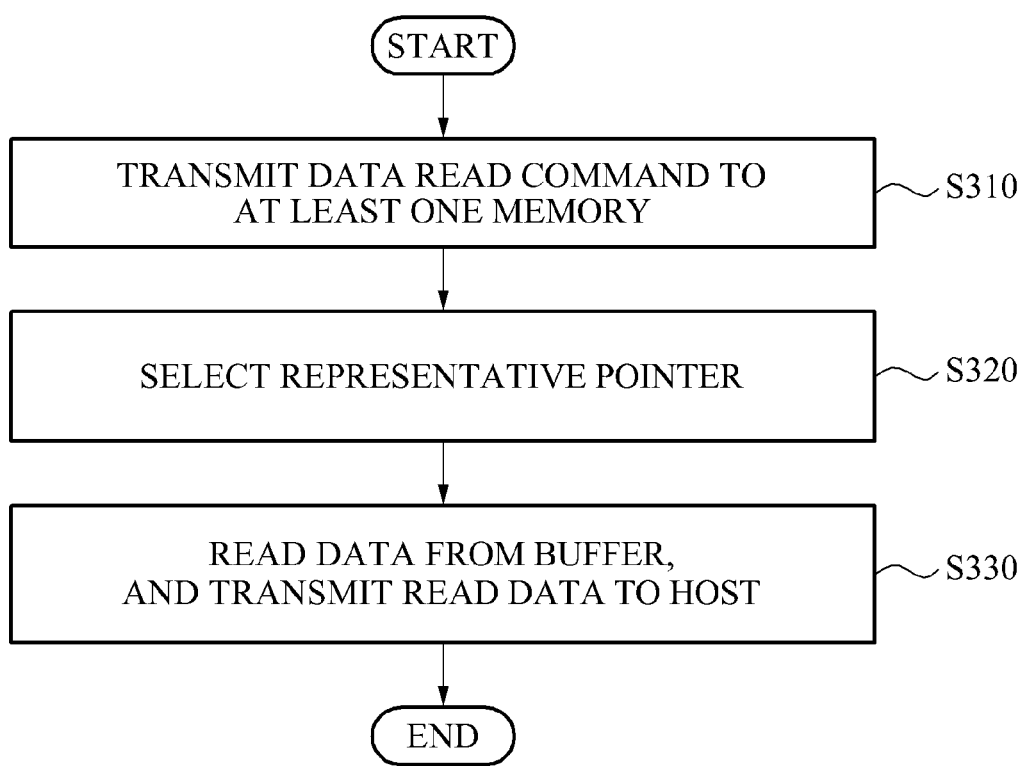
FIG. 3 is a flowchart illustrating a method of operating an SSD controller according to an embodiment of the present invention.

FIG. 3 is a flowchart illustrating a method of operating an SSD controller according to an embodiment of the present invention.

In operation S310, when a data read command is transmitted by a host, the data read command may be transmitted to at least one memory.

In this instance, the at least one memory may write the data in a buffer by referring to at least one first pointer that may be referred to when the at least one memory writes the data in the buffer.

The buffer may correspond to a DRAM buffer.

Also, the buffer may correspond to a circular buffer.

Additionally, the at least one memory may correspond to at least one flash memory.

In operation S320, a pointer having a lowest pointer value may be selected, as a representative pointer, from the at least one first pointer by checking a point in time when the data writing is completed in the buffer by the at least one memory.

In operation S330, the data may be read from the buffer by referring to a second pointer, and the read data may be transmitted to the host, based on the representative pointer. Here, the second pointer may be referred to when the data is read from the buffer, and transmitted to the host.

In operation S330, when a pointer value of the representative pointer is greater than a pointer value of the second pointer, the data may be read by moving the second pointer in the buffer until the pointer value of the second pointer is equal to the pointer value of the representative pointer.

Figure 4:
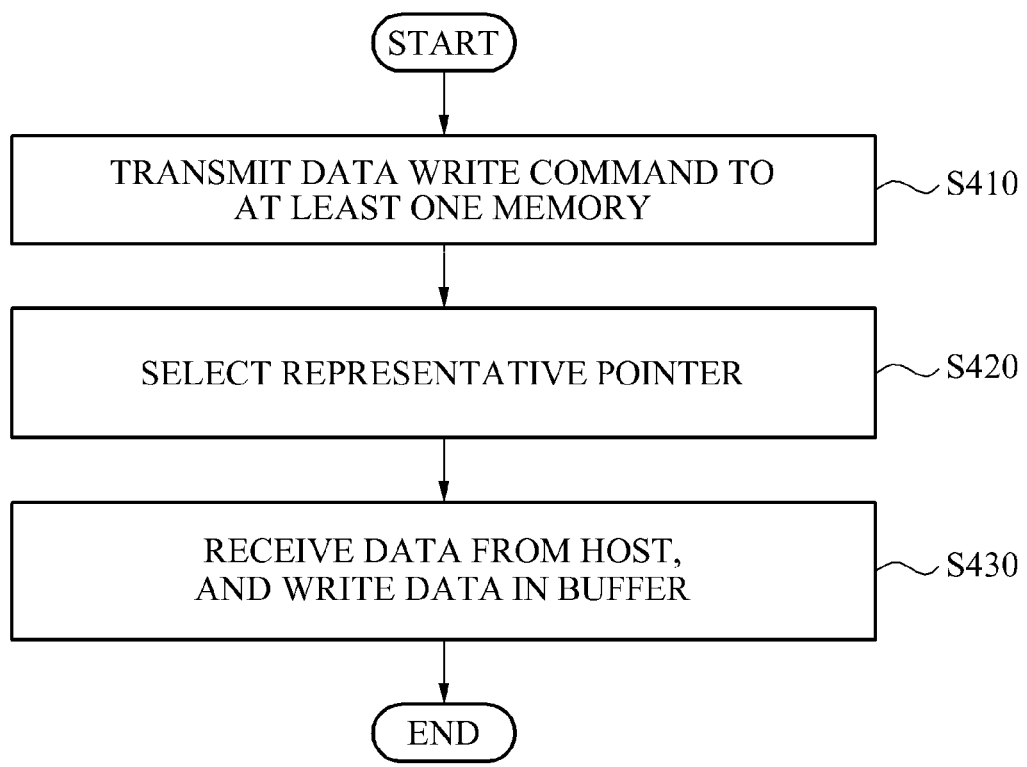
FIG. 4 is a flowchart illustrating a method of operating an SSD controller according to another embodiment of the present invention.

FIG. 4 is a flowchart illustrating a method of operating an SSD controller according to another embodiment of the present invention.

In operation S410, when a data write command is transmitted by a host, the data write command may be transmitted to at least one memory.

In operation S420, a representative pointer may be selected from at least one first pointer by checking a point in time when data is read from the buffer by the at least one memory. Here, the at least one first pointer may be referred to when the data is written in a buffer by the at least one memory.

The buffer may correspond to a DRAM buffer.

Also, the buffer may correspond to a circular buffer.

Additionally, the at least one memory may correspond to at least one flash memory.

In operation S430, the data may be received from the host, and the received data may be written in the buffer based on the representative pointer, by referring to a second pointer that may be referred to when the data transmitted from the host is written in the buffer.

In operation S430, when a pointer value of the representative pointer is less than a pointer value of the second pointer, the data may be written by moving the second pointer in the buffer until the pointer value of the second pointer is equal to the pointer value of the representative pointer.

The methods of operating the SSD controller according to embodiments of the present invention have been described with reference to FIGS. 3 and 4. Here, the methods may correspond to the configurations of the SSD controllers described with reference to FIGS. 1 and 2, and accordingly further descriptions will be omitted for conciseness.

The methods of operating the SSD controller according to the above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A Solid State Drive (SSD) controller, comprising:
   a command unit adapted to transmit a data read command to at least one memory when the data read command is transmitted by a host;
   a pointer selection unit adapted to select a representative pointer having a lowest pointer value from a plurality of pointers, by checking a point in time when data writing is completed in a buffer by the at least one memory; and
   a transmitter adapted to read the data from the buffer by referring to a second pointer, and to transmit the read data to the host, based on the representative pointer,
   wherein the at least one memory writes the data in the buffer by referring to the a plurality of pointers.

2. The SSD controller of claim 1, wherein, when a pointer value of the representative pointer is greater than a pointer value of the second pointer, the transmitter reads the data by moving the second pointer in the buffer until the pointer value of the second pointer is equal to the pointer value of the representative pointer.

3. The SSD controller of claim 1, wherein the buffer corresponds to a circular buffer.

4. A Solid State Drive (SSD) controller, comprising:
   a command unit adapted to transmit a data write command to at least one memory when the data write command is transmitted by a host;
   a pointer selection unit adapted to select a representative pointer having a lowest pointer value from a plurality of pointers, by checking a point in time when data is read from a buffer by the at least one memory; and
   a writer adapted to receive the data from the host, and to write the data in the buffer by referring to a second pointer, based on the representative pointer,
   wherein the at least one memory reads the data from the buffer by referring to the plurality of pointers.

5. The SSD controller of claim 4, wherein, when a pointer value of the representative pointer is less than a pointer value of the second pointer, the writer writes the data by moving the second pointer in the buffer until the pointer value of the second pointer is equal to the pointer value of the representative pointer.

6. The SSD controller of claim 4, wherein the buffer corresponds to a circular buffer.

7. A method of operating a Solid State Drive (SSD) controller, the method comprising:
   selecting, as a representative pointer, a pointer having a lowest pointer value from a plurality of pointers, by checking a point in time when data writing is completed in a buffer by the at least one memory; and
   reading the data from the buffer by referring to a second pointer, and transmitting the read data to the host, based on the representative pointer,
   wherein the at least one memory writes the data in the buffer by referring to the plurality of pointers.

8. A method of operating a Solid State Drive (SSD) controller, the method comprising:
   transmitting a data write command to at least one memory when the data write command is transmitted by a host;
   selecting, as a representative pointer, a pointer having a lowest pointer value from a plurality of pointers, by checking a point in time when data is read from a buffer by the at least one memory; and
   receiving the data from the host, and writing the data in the buffer by referring to a second pointer, based on the representative pointer,
   wherein the at least one memory reads the data from the buffer by referring to the plurality of pointers.

9. A non-transitory computer-readable medium comprising a program for instructing a computer to perform the method of claim 7.

10. A non-transitory computer-readable medium comprising a program for instructing a computer to perform the method of claim 8.

* * * * *